Jan. 22, 1952   C. G. KRONMILLER ET AL   2,583,180
SYNCHRONOUS MOTOR
Filed March 10, 1949   2 SHEETS—SHEET 1

INVENTOR.
CARL G. KRONMILLER
WILLIS H. GILLE
BY
*George H Fisher*
ATTORNEY

Jan. 22, 1952     C. G. KRONMILLER ET AL     2,583,180
SYNCHRONOUS MOTOR
Filed March 10, 1949

INVENTOR.
CARL G. KRONMILLER
WILLIS H. GILLE
ATTORNEY

Patented Jan. 22, 1952

2,583,180

UNITED STATES PATENT OFFICE 2,583,180

SYNCHRONOUS MOTOR

Carl G. Kronmiller, Minneapolis, and Willis H. Gille, St. Paul, Minn., assignors to Minneapolis-Honeywell Regulator Company, Minneapolis, Minn., a corporation of Delaware Application March 10, 1949, Serial No. 80,668

25 Claims. (Cl. 172—278)

This invention relates to electric motors and more particularly to the small single phase synchronous type of low power electric motor suitable for operating clocks or similar timing mechanisms. Small synchronous clock motors are generally old, particularly that type which utilizes a single energizing winding for producing the magnetic field, and it is a primary object of this invention to provide an improved motor of this general type which is simple in design, inexpensive to manufacture, which requires no maintenance and which utilizes a small amount of power for operation.

It is also an object of this invention to provide in a small synchronous motor an improved design and arrangement of pole piece rings for the field structure which carry the pole pieces, the rings being adapted for punch press type of manufacture and which may be readily assembled into the stator of the motor.

It is further an object of this invention to provide in a small synchronous motor an improved field structure which permits the utilization of a shading means which is common to all of the pole pieces energized from a particular portion of the magnetic core of the motor.

It is still further an object of this invention to provide a magnetic field structure in which there is radially an overlapping of the pole pieces all of which extend a maximum surface from which flux lines emanate to the air gap to provide for improved flux distribution in the field structure.

Another object of this invention is to provide in a small synchronous motor of this type a field structure in which all poles originate from one side of the energizing core and coil and extend axially of the motor, the poles being alternately shaded and unshaded and energized from opposite ends of the magnetic core.

Another object of this invention is to provide in a small synchronous motor a field structure in which all poles originating from one side of the energizing core and coil and extending axially of the motor are alternately shaded and unshaded with the shaded and unshaded poles formed on separate pole rings.

Another object of this invention is to provide in a synchronous motor field structure an arrangement of field poles extending axially of the axis of the motor and separated into inner and outer groups spaced radially from one another to form an annular air gap therebetween into which a rotor is positioned, the individual poles of each group exposing a maximum portion of its surface to the rotor.

It is another object of this invention to provide in a synchronous motor of this type an arrangement where the energizing coil is separated from the pole portions of the magnetic field structure, rotor and gear train by an oil tight seal.

A further object of this invention is to provide a motor in which the energizing coil may be removed from the field structure without disassembling any other portion of the motor.

It is also an object of this invention to provide in a synchronous motor an arrangement in which the rotor is mounted on and journaled in a gear train which is mechanically independent of the magnetic field structure.

Another object of this invention is to provide in a synchronous motor an oil tight cavity in which the gear train, rotor, and field portions are located remote from the energizing coil of the motor, and into which cavity access can be had for oiling purposes without removing or puncturing the enclosing elements.

These and other objects of this invention will become apparent from a reading of the specification together with the drawing in which.

Figure 1:
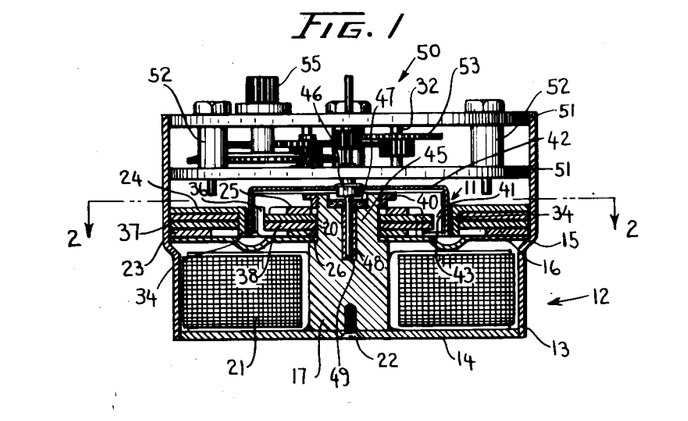
Figure 1 is a sectional view of one embodiment of the motor showing the location and arrangement of the field structure parts.
Figure 2:
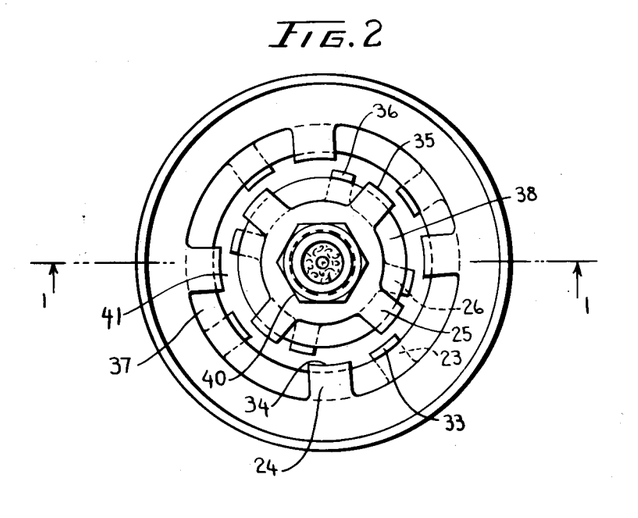
Figure 2 is a top view of the motor of Figure 1 with the rotor and gear train removed to show the positioning of the pole pieces in the field structure.

The embodiment of the small synchronous clock motor disclosed in Figures 1 and 2 comprises essentially a magnetic field structure or stator indicated generally at 12 and a rotating element or rotor indicated at 11. The improvement in the motor design lies in the design and arrangement of the parts of the magnetic field structure 12 and it is to be understood that this element may be used with any of the conventional types of rotating elements to give a synchronous motor design, an induction motor design, or a hysteresis or eddy current type of motor. Referring to the drawings in detail, it will be seen that the magnetic field structure 12 includes a cup-shaped structure which houses the parts of the field structure and rotor and which also performs a function in the motor design which will be later indicated. The cup-shaped structure has been disclosed in the drawing as containing two parts; a cylinder 13 and an end plate 14, both of magnetic material, but it is to be understood that these two parts can be integral with one another. Cylinder 13 is flared or enlarged throughout one portion to provide a shoulder 15 at which a sealing plate 16 of nonmagnetic material is located. Sealing plate 16 is secured to the cylinder 13 by silver solder or any other suitable sealing material. The center of this plate has an aperture therein through which is positioned a cylindrical core of magnetic material 17. Sealing plate 16 fits over a reduced portion 20 of core 17 and is similarly sealed to the core at this surface with a silver solder. Magnetic core 17 and the sealing plate 16 divides the cylinder 13 into two chambers, one of which contains the energizing winding 21 of the motor which is positioned on or about the magnetic core. End plate 14 of the cup-shaped magnetic structure encloses this portion of the cylinder which contains winding 21 and is secured to the magnetic core by suitable means such as a screw 22. Should the cup-shaped structure be a single piece, the method of fabricating or assembling the motor would be somewhat changed in that the winding would be inserted on the magnetic core and the sealing plate added to enclose the winding. With this arrangement the winding could not be removed or checked without removal of the sealing plate.

Positioned above the sealing plate is that portion of magnetic field structure 12 which carries the pole pieces. This portion of the magnetic field structure is composed of a plurality of pole piece rings 23, 24, 25, and 26 of which the outer rings 23, 24 are common to the cylinder 13 and hence through plate 14 to one end of the magnetic core 17 while the inner rings 25, 26 are common to the opposite end of the magnetic core 17 or the reduced portion 20 of said member. Each of the rings 23, 24, 25 and 26 is annular in shape and contains four pole teeth or pole pieces equally spaced apart, as will be later identified, which is bent or extend normal to the plane of said rings. Thus the outer pole ring 23 contains pole pieces 33 on the inner periphery of the ring which extend normal to the plane of the ring. Similarly the pole piece ring 24 contains four pole pieces 34 which are located on the inner periphery of the ring and extend normal to the plane of the ring. The inner pole piece rings 25, 26 each contain four poles or pole pieces 35, 36 respectively which are located on the outer periphery of said rings and extend normal to the plane of said rings. Outer pole rings 23, 24 are so positioned that the pole pieces 33, 34 respectively thereon extend in a direction of one another and the rings 23, 24 are separated by shading means 37 which herein is an annular ring of copper. Two such rings are disclosed in the present structure and these rings assist in spacing the pole piece rings a given distance apart such that the extent of the pole pieces 33, 34 cover substantially the distance between the rings. Rings 23, 24 may be held in position by any means such as a silver solder connection (not shown) at the upper surface of pole piece ring 24 where it abuts the wall of the cylinder 13. The inner pole piece rings 25, 26 are similarly positioned such that the pole pieces thereon 35, 36 respectively extend toward one another or in the direction of the opposite ring, and these rings are spaced apart by shading means 38 which take the form of circular or annular copper rings. Here also, two such rings are used to provide proper shading and spacing. The inner pole piece rings 25, 26 are secured to the core member 17 by means of a clamping nut 40 which is screwed onto a threaded section of the upper portion 20 of the magnetic core 17. It will be noted that the spacing of the inner and outer pole rings provides an annular air gap 41 in which the rotor assembly 11 is positioned.

The rotor assembly 11 is comprised of a cup-shaped frame 42 of a nonmagnetic but electrically conductive material, such as aluminum, and a band of magnetic material 43 having a high hysteresis coefficient. Band 43 is positioned on the wall portion of the cup-shaped frame 42 such that it extends between the pole pieces of the magnetic field structure. The cup-shaped frame 42 is secured to a shaft 45 by means of bushings 46 pressfitted onto a shaft 45 on either side of the frame 42. The shaft 45 fits into a sleeve 49 of bearing material which is located in an aperture 48 in the magnetic core 17, which sleeve provides bearing surfaces for the shaft. The upper portion 20 of magnetic core 17 also includes an aperture in which is positioned a wick 47 containing oil for lubricating the bearing connection between the shaft 45 and the sleeve 49. The opposite end of the shaft 45 is journaled in a gear assembly indicated at 50 (shown in full in Figure 1) which assembly is also housed in the upper portion of the cylinder 13. The gear assembly includes two brass side plates 51 secured in a spaced relationship by bushings 52 and housing a plurality of gears and pinions 53 which cooperate with the shaft 45 and the output shaft and pinion 55. The speed of the present motors, as will be discussed later, is 900 r. p. m. on a 60 cycle input since it is an eight pole synchronous motor and the gearing arrangement used herein reduces the output speed at the pinion 55 to 8 r. p. m. The gear assembly 50 may be secured in any manner (not shown) to the cylinder 13.

In the magnetic field structure 12 heretofore described it is the shape and the arrangement of parts which represents the advance in the small synchronous motor art. Pole pieces 33 and 34 of the outer pole piece rings extend axially of the motor axis and are arranged in pairs such that each pair subtends a greater angular distance or is wider than the space between the consecutive pairs of pole pieces. In this structure four such pairs appear. Of the individual pole pieces 34 and 33 of the respective rings the pole pieces 34 subtend a larger angle or arc and are of greater width than the pole pieces 33. The upper pole piece ring 24 and hence the pole pieces 34 of that ring are the shaded poles of the outer pair of pole rings 23, 24 and hence the shaded poles are larger than the unshaded poles in this arrangement. The axial disposition of the pole pieces 33, 34 represents a large pole face area to the rotor 11 thus utilizing a maximum of flux lines present in these members to effect a maximum efficiency of the motor. Similarly the structure of the inner pole piece rings 25, 26 includes four unshaded poles 36 and four shaded poles 35 extending axially of the motor and presenting large shaded poles 35 which similarly subtend a larger angle than the unshaded poles 36. The shaded pole ring 25 for this arrangement is located above or on top of the lower pole piece ring 26. In this arrangement also the individual rings are so positioned that there are formed pairs of pole pieces each pair including a shaded and an unshaded pole with a greater angular distance being occupied by the pairs of pole pieces than by the space between each consecutive or adjacent pair of poles. As heretofore noted the arrangement herein represents an eight pole synchronous motor. The space occupied by the pairs of poles angular is the same for the outer and inner pole piece rings but because of the difference in radii from the center of the magnetic core to the respective rings, the inner pole piece rings will subtend a shorter linear distance along an arc drawn from the center of this motor than will each pair on the outer pole of pole rings. Angularly, each pair of pole pieces subtends an arc distance which is slightly greater than 22½ degrees and the space between each pair of such poles is slightly less than the arc of 22½ degrees. This arrangement gives an overlapping between the consecutive or adjacent pairs of pole pieces on the inner and outer pole piece rings 23, 24, 25, 26 respectively. The rings are so positioned also that the shaded pole for each ring overlaps an unshaded pole on the opposite ring in the adjacent pairs of pole pieces. This overlapping gives a desired bridging effect between the pole pieces which provides for a better distribution of the magnetic flux line in the magnetic field structure. With the arrangement shown in Figure 2, the rotation of the magnetic field and hence the rotor will be clockwise as viewed from the top of the motor.

In operation, this motor is generally similar to a synchronous motor. The energizing winding 21 on the magnetic core 17 is energized from a single phase source (not shown). Upon energization the magnetic core 17 is polarized or magnetized such that a different polarity exists at either end of the magnetic core. This polarity changes with the change in the direction of current flow from the energized source. The end of the magnetic core 17 abutting the end plate 14 energizes the outer pole piece rings 23, 24 through the magnetic path of the end plate 14 and walls of the cylinder 13. Thus the outer pole piece rings each receive flux lines from this end of the magnetic core. Similarly the inner pole piece rings 25, 26 receive its energizing flux from the upper end of the magnetic core 17 or the end to which they are common. The inner and outer pole piece rings will then be energized magnetically with flux at an opposite polarity. The magnetic circuits for the flux lines from the core 17 includes the end plate 14, cylinder 13, rings 23, 24 and associated pole pieces 33, 34, rotor 11, rings 25, 26 and associated pole pieces 35, 36 and magnetic core 17. Depending upon instantaneous polarities due to the alternating energizing current, the flux will traverse the magnetic circuits in one direction or the other moving across the air gap 41 and through the rotor 11, between pole pieces which are energized at that instant. The shading rings 37 and 38 between the outer and inner rings respectively are so located that they affect the flux lines entering, in each case, the upper pole piece ring 24 or 25 respectively. The flux lines in these upper inner and outer rings pass through circuits which include the shading rings 37, 38 and are retarded by the effect of the short-circuited electrical conductor in a manner well known in the art. With the arrangement and spacing of the respective shaded and unshaded pole pieces in each pair and between the pairs, it will be seen that a rotating flux field is obtained which acts upon the rotor assembly 11 in a well known manner. The aluminum cup-shaped frame 42 acts as an induction motor to provide sufficient starting torque and as synchronous speed is approached, the hard steel rotor band 43 of this rotor assembly becomes polarized or permanently magnetized with poles such that the motor locks in a synchronous speed of 900 revolutions per minute.

Figure 3:
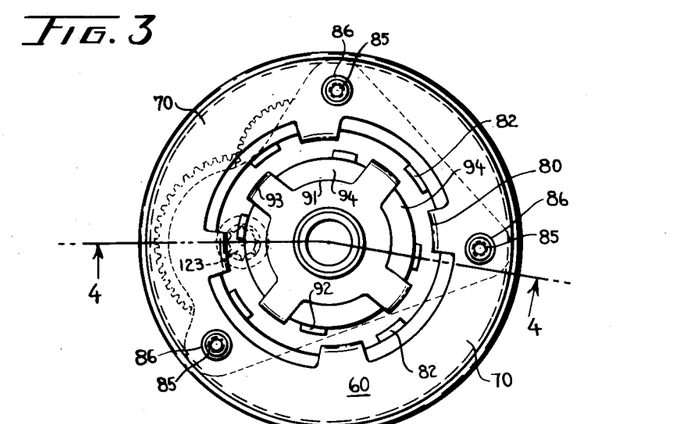
Figure 3 is a top view of the preferred embodiment of this motor design with the cover removed and the gear train shown in phantom to give a disclosure of the positioning of the field structure parts.

The preferred embodiment of our motor design which is disclosed in Figures 3, 4 and 5 contains substantially the same magnetic field structure or stator arrangement disclosed in Figures 1 and 2 but includes certain improvements which will be pointed out below. This preferred motor contains generally three main components; namely, the motor field assembly indicated generally at 60, the gear train and rotor assembly indicated at 61 and the cover assembly indicated at 62.

The motor field assembly 60 has a centrally located magnetic core 63 upon which is positioned an energizing winding 64. Associated with the magnetic core 63 and winding 64 is the magnetic field structure composed of pole piece rings and shading means later to be identified. One extremity of said magnetic core 63 has a tapped aperture 65 into which is threaded a screw 66 to secure an end plate 67 to said end of the magnetic core. Surrounding core 63 and energizing winding 64 and abutting against the end plate 67 is an outer pole piece ring 70 of the magnetic field structure for motor field assembly 60. Outer pole piece ring 70 is generally cylindrical in form having an upper section of reduced diametrical dimensions 71, a transverse ring-like section 72 normal to the cylindrical portion of the ring and four downwardly extending pole pieces 80 which originate from the transverse section of the pole piece ring 70, as seen in Figure 4. A shoulder 73 is formed between the main portion of the ring 70 and the reduced diametrical section 71 for purposes which will be later noted. From a comparison of Figures 1 and 2 with the preferred embodiment of this invention it is to be seen that the outer pole piece ring 70 is actually a composite structure including a portion of the cylindrical casing 13 of Figure 1 and the upper pole piece ring 24 of Figure 1, thereby providing the housing for the core 63 and coil 64 of the motor. It will be readily understood that the end plate 67 and pole piece ring 70 are made of a magnetic material and thereby a magnetic path from one extremity of the magnetic core 63 to the outer pole piece rings is provided.

The extremity of the magnetic core 63 opposite the tapped aperture 65 has a portion or section 74 of reduced diametrical dimension and an aperture 75 centrally located with the axis of the magnetic core. An annular disk-like sealing plate 76 is fitted down over the reduced portion 74 of magnetic core 63 to abut at its inner periphery against the shoulder formed by the reduced portion 74 and the main portion of the magnetic core 63. Annular sealing plate 76 also abuts against the outer pole piece ring 70 at the shoulder 73 formed between the reduced diametrical section 71 and the outer portion of the pole ring 70. The annular sealing ring is sealed by any suitable method (not shown) to the annular pole piece ring 70 and the magnetic core 63 to provide an oil type seal at these two areas of abutment. As in the embodiment of Figures 1 and 2, sealing plates 76 partitions the energizing winding 64 from the remaining portion of the motor to provide an oil type cavity within which the energizing winding is located.

Located directly above the sealing plate 76 are the pole piece rings and pole pieces of the magnetic field structure. As previously recited the outer pole piece ring 70 included a ring-like portion 72 from which the pole piece 80 originated. A cooperating outer pole piece ring 81 having pole pieces 82 originating therefrom is positioned in abutting relationship with this seal plate 76 and abutting against the reduced portion 71 of the outer pole piece ring 70. The pole pieces 80 and 82 of the outer pole piece rings 70 and 81 are positioned axially of the magnetic core, as in the embodiment of Figures 1 and 2, and have positioned therebetween ring-like shading means 84. As in the first described embodiment, the pole piece rings are so positioned that the pole pieces thereon extend in the direction of one another to enclose the shading means 84. Outer pole piece rings 70 and 81, shading means 84 and the ring-like seal plate 76 are held in assembled relationship by three rivet-like members 85. The rivet-like members 85 are irregular in shape having a main body portion of one dimension which fits down through apertures in the pole piece rings 70 and 81, shading means 84 and seal plate 76 to be riveted over or flatted out against the under side of the seal plate. Rivet members 85 also have a shoulder portion 86 which keeps the main body of the rivet from passing through the apertures in the shading means, pole piece rings and seal plate; and above this portion another section of reduced diameter, the purpose of which will be later described. This upper portion of the rivet member 85 and the shoulder portion 86 have a tapped aperture therein which as will be later described provide the means for mounting for the gear train assembly 61.

The portion of the magnetic field 60 heretofore described is assembled by placing in the outer pole piece ring 70, the shading means 84, pole piece ring 81 and the seal plate 76 and securing the same in assembled relationship by means of rivets 85. Magnetic core 63 is then inserted through the aperture in seal plate 76 to the extent of its reduced portion 74 and as will hereinafter be described, inner pole piece rings 90, 91 are assembled on this reduced portion and secured thereto. Plate 76, as heretofore described is then sealed to pole piece ring 70 and core 63 to provide the oil tight cavity for winding 64. End plate 67 is secured to core 63 to enclose the winding or energizing coil.

The reduced section 74 of magnetic core 63 against which the inner periphery of the seal plate 76 abuts serves as the mounting area for the pair of inner pole piece rings 90 and 91. These inner rings abut at their inner periphery against the reduced section 74 of magnetic core 63 and have emanating from their outer periphery the pole pieces 92, 93 respectively in the same manner as that described in Figures 1 and 2. The pole pieces 92, 93 are bent normal to the general plane of the pole piece rings and when positioned on the magnetic core extend axially of the magnetic core. Positioned between the pole piece rings 90 and 91 is the inner shading means 94, the pole piece rings being so positioned that the pole pieces thereon extend in the direction of one another to enclose the shading means 94. The inner pole pieces 92, 93 of pole piece rings 90, 91 respectively are positioned at a shorter radial distance from the geometric center of the motor or axis of the magnetic core than the pole pieces 80, 82 of the outer pole piece rings 70, 81 to provide therebetween an annular air gap such as can be seen in Figure 3 and has been previously described in Figures 1 and 2. These annular pole piece rings are secured on the reduced section 74 of the magnetic core 63 by means of an operation which entails bending over the upper extremity of the magnetic core 63 as can be seen in Figure 4. Such an operation is accomplished by placing a suitably conically shaped tool in the aperture 75 of the magnetic core 63 and bending or pressing the upper extremity of the reduced portion 74 into an overlapping relationship with the upper pole piece ring 91.

The structure thus far described constitutes the motor field assembly 60 and the preferred embodiment of our invention. With the exception of the shading means 84 and 94, the seal plate 76 and the winding 64, all portions of this structure are made of a magnetic material. The shading means 84, 94 are constructed from an electrically conductive material in a well known manner and a seal plate 76 is made of a nonmagnetic material. As was described in connection with Figures 1 and 2, the pole piece rings 70, 81, 90 and 91 are so positioned that the pole pieces thereon form pairs of shaded and unshaded pole members with a greater angular spacing between the consecutive pairs for the inner and outer structures than is found between the pole pieces of each consecutive pair. Similarly, as in Figure 1, the consecutive pairs of pole pieces on the inner and outer rings are so positioned that the pairs on one section are positioned adjacent the space between the adjacent pairs on the opposite or outer section. The magnetic field structure of the motor field assembly 60 produces a rotating flux field from single phase energization of the winding 64 in the same manner as that described in connection with Figures 1 and 2 and hence will not be further described here. Field coil 64 on magnetic core 63 is energized through electrical conductors 100 which pass through suitable apertures (not shown) in the main portion of outer pole piece ring 70 to be connected to the extremities of the winding 64.

Motor field assembly 60 is designed to mount and position the gear train and rotor assembly 61 through connections to the rivet members 85, heretofore described, which hold the outer pole piece rings 70, 81 in assembled relationship. The mechanical connection between the gear train and rotor assembly 61 and the motor field assembly 60 is made through nonmagnetic parts and the rotor of the former assembly, which is its only component made of magnetic material, is the only part in magnetic association with the motor field assembly.

Figure 4:
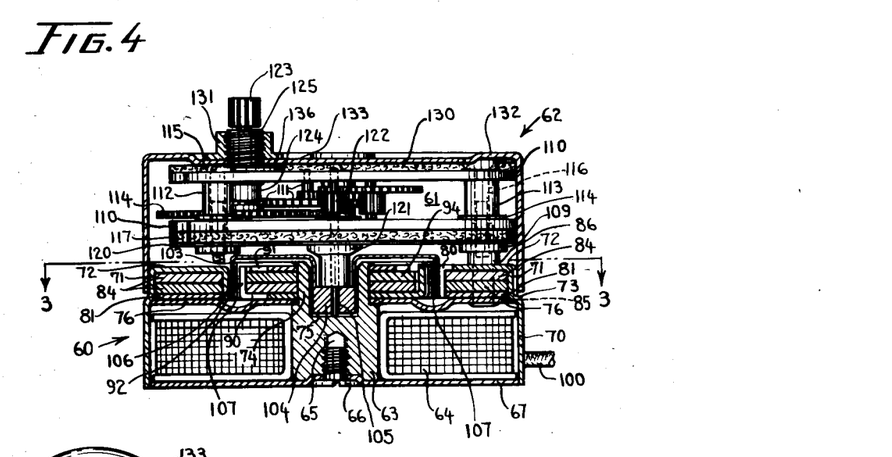
Figure 4 is a side elevation view of the motor of Figure 3 with the field structure shown in section taken along the line 4—4 in Figure 3, the gear train shown in full, and the rotor and cover shown in section to disclose the relationship of the motor parts.
Figure 5:
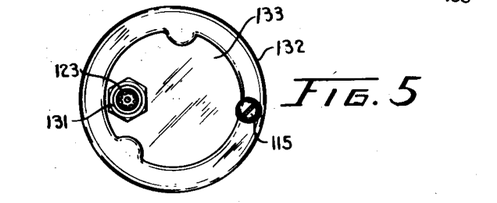
Figure 5 is a top view of the preferred embodiment of the motor completely assembled.

Referring now to Figure 4, it will be seen that the gear train and rotor assembly is shown in full with the exception of the rotor which is shown in cross section. It will further be seen that the motor field assembly is shown in cross section such that a disclosure of the association of relationship of parts can be had. Similarly the cover assembly 62 is shown in cross section to disclose the gear train and the sectional portion of the motor field assembly. The rotor of this motor includes a cup-shaped member 103 of nonmagnetic but electrically conductive material. This cup-shaped member 103 is a machined part having a centrally located hub portion 104 which fits into the aperture 75 of the magnetic core 63 and mounts the shaft 105 of the rotor. The cup-shaped portion of the rotor houses a hardened steel band 106 of high magnetic retentivity on the inner walls of the upstanding portion of this cup-shaped member. The band 106 is press fitted into the cup-shaped member and held there due to the frictional force of engagement between the members. Band 106 is notched about its lower periphery, as can be seen at 107 in Figure 4, the notches assisting in defining the polar regions of a magnetic rotor as the rotating element reaches a synchronous speed. This rotor is substantially that described in connection with Figures 1 and 2 and is generally well known in the art of small synchronous motors. As previously indicated, the rotor is positioned between the pole pieces on the inner and outer pole piece rings in an air gap obtained by the spacings of these elements and is designed to rotate within that air gap about the axis of shaft 105.

This rotating element or rotor is journaled in the remaining portion of the gear train and rotor assembly 61 within suitable bearing elements, as will be later described, contained in the side plates 110 of the gear train and rotor assembly. The side plates 110 which house and journal a plurality of gears and pinions 111 are held in spaced relationship by spacer members 112 and 113, these members having shoulder portions 109 at their extremities. Spacer members 112 and 113 fit through apertures in the side plates 100 and have portions riveted over on the inner surface of the lower gear plate, as at 114, and at the outer surface of the upper gear plate (not shown) to maintain a rigid and assembled relationship of these elements. Spacer members 112 and 113 have central apertures through which mounting screws 115 extend into contact with the rivet members 85 to engage the latter in a threaded relationship securing gear train to the motor field assembly. The spacer members 112 and 113 of the gear train are three in number and are identical with the exception that the spacer 113, one of which appears in the gear train, has a transverse duct 116 or aperture located approximately midway between the side plates 110. Duct 116 extends to or connects with the main axial aperture of spacer element 113. The purpose of this duct 116 will become evident as the disclosure proceeds.

On the under side of the lower side plate 110, as seen in Figure 4, there is positioned a felt pad 117 having the general configuration of the side plate, and this pad is held in position by a retaining plate 120. Shoulder portions on the spacer elements 112 and 113, as previously described, hold the retaining plate and the pad in abutting relationship with the side plate 110. Retainer plate 120 and felt pad 117 have apertures therein through which a bearing member 121 which is mounted on the lower plate 110 extends, this latter member journaling the shaft 105 of the rotor. Upper plate 110 also journals shaft 105, but because member 121 takes most of the load of the rotor, no specific bearing member need be provided therein. Bearing member 121 may be of any suitable bearing material.

The shaft 105 as noted above is journaled in bearing member 121 and an aperture in upper side plate 110. A pinion 122 mounted on the shaft 105 between the side plates cooperates with the plurality of pinion and gears 111 of the gear train to drive the latter and position an output shaft or pinion 123 of the gear train in a well known manner. The output shaft and pinion 123 of the gear train are similarly journaled in a bushing member or bearing member 124 and the lower side plate 110. The extremity of bushing 124 outside the confines of the side plates 110 is threaded, as at 125, for purposes which will be later noted. Positioned on the upper side of the upper side plate 110 is a second felt pad 130, which as will be later noted is held in position by the cover assembly 62.

Cover assembly 62 includes a cover 132 and the lock nut 131. Cover 132 is cup-shaped in form and is of the same diametrical dimension as the main portion of the motor field structure such that it may fit down over the reduced portion 71 of outer pole piece ring 70 to provide a motor which is cylindrical in form. The upper portion of the cover is recessed as at 133, as shown in Figure 5. Within this recess is an aperture through which the tapped section 125 of the bearing sleeve 124 extends to be engaged by the lock nut 131. Lock nut 131 is threaded onto the threaded portion 125 to secure the cover 132 in place on the motor field assembly and gear train assembly. It will be noted in Figure 4 that the screws 115 which fit down into the two spacer elements 112 and secure the same to the motor field through the rivet members 85 are positioned underneath the cover. Appropriate raised portions in the general configuration of the recess 133, as shown in Figure 5 provide clearance for the heads of the screws so that the cover can be fitted down in closely assembled relationship with the gear train. The screw 115 which passes through the spacer member 113, however, is not positioned underneath the cover, but rather, as indicated in Figure 5, extends through an aperture in the cover, and passes through the spacer member 113 and into the tapped portion of the rivet member 85 to secure this portion of the gear train and also the cover in assembled relationship. As was previously noted spacer element 113 has a transverse duct 116 connected to the central aperture in the spacer member. The screw which fits into this spacer element is adapted to be removed from its assembled position without removing the cover. When this screw is removed a passageway is provided from outside the cover to the interior of the gear train such that the motor may be reoiled without disassembling the motor. The cover assembly is made oil tight with the remaining portion of the motor by means of a rubber basket 131 positioned between a portion of the sleeve 124 and the cover 132. Similarly the screw 115 which passes through sleeve 113 from without the cover, as well as the circular surface of the cover as it engages the pole piece ring 70 are sealed with a suitable sealing material not shown. Thus, when the motor is completely assembled a sufficient quantity of oil may be applied to the felt pads, and the motor so sealed as described above as to prevent escape of the oil from the exterior of the motor. It will be further noted that the seal plate 76 prohibits the oil from entering the recess or cavity wherein the energizing coil is located and hence no oil will be lost through absorption by this member.

The motor described in the preferred embodiment operates in the same manner as that described in connection with the Figures 1 and 2. The pole piece rings 70, 81, 90 and 91 with their associated pole pieces receive the flux lines emanating from the respective ends of the magnetic core and provide a rotating flux field as heretofore described. In the present arrangement the pole pieces 80 of outer ring 70 and the pole pieces 93 of inner ring 91 are shaded by the respective shading means 84 and 94. The pole pieces cooperate with the rotor members 103 and 106, that is, the electrically conductive element and the magnetic element, to provide a self starting synchronous motor of the hysteresis type. This motor as described in connection with Figures 1 and 2 is an 8-pole synchronous motor having a synchronous speed of 900 R. P. M. with 60 cycles energization. The gear train disclosed in the drawings and not described in detail includes the gear and pinion members to effect a reduction in speed from 900 R. P. M. to 8 R. P. M.

The magnetic field structure described in connection with the embodiments of our invention is one which is easily manufactured and also easily assembled to provide a compact highly efficient unit for motors of this type. The present motor designs described herein operate on less than 2 watts power input and have an exceptionally low pull-in and drop-out voltage requirement with a high pull-in torque and a low drop-out torque. They further provide sufficient overall power output to meet the demands on such small motors. With the present motor designs it is possible to maintain the energizing windings separate from the pole piece rings and gear train and thus keep this portion entirely free of oil or immersed in a suitable cooling medium if desired. The embodiment of Figures 3, 4 and 5 further discloses a preferred arrangement of gear train, rotor and cover such that an oil tight unit is provided capable of giving exceptionally long life performance. Should it become necessary to add additional lubricant to the gear train after the motor has been in use for some time, the same can be accomplished by simply removing the exposed cover screw and inserting the oil through passage heretofore described. This operation does not entail disassembling the motor or disturbing the remaining oil seals in any manner. After the motor has been oiled the screw is again inserted and covered with a suitable material in such a manner that the original oil tight motor design is again obtained.

In considering this invention it should be kept in mind that the present disclosure is intended to be for a large part illustrative only and the scope of the invention is to be determined only by the appended claims.

We claim:

1. In a motor, a magnetic field structure including an energizing core with a winding thereon and a plurality of pole piece members attached to said magnetic core, one of said pole piece members being cup shaped in form and positioned to partially enclose said core and winding, said one of said pole piece members having a peripheral shoulder thereon continuous in form, a rotor magnetically associated with said field structure, a gear train connected to said rotor and mounted on said field structure, and casing means having a periphery of the same shape as said shoulder resting on said shoulder of said pole piece member and enclosing said gear train and rotor.

2. In a motor, a magnetic core with an energizing winding thereon, a magnetic field structure energized by said magnetic core and including pole piece structures attached to either end of said magnetic core, one of said pole piece structures having a shoulder thereon, each of said pole piece structures having pole pieces thereon originating from said pole piece structures at the same radial region with respect to one end of said magnetic core and extending axially of said magnetic core, shading means encircling alternate pole pieces of each of said pole piece structures to provide alternately shaded and unshaded pole pieces, a rotor magnetically associated with said field structure, a gear train attached to said rotor and mounted on said field structure, and a cover member resting on said shoulder of one of said pole piece structures and enclosing said gear train.

3. In a synchronous motor, a magnetic core with an energizing winding thereon, a magnetic field structure energized by said magnetic core and including a plurality of inner and outer pole piece rings, said inner and outer pole piece rings each having pole pieces thereon which are positioned axially of said magnetic core and which pole pieces extend toward the opposite pole piece ring, shading means located between said rings to provide rings of shaded and rings of unshaded pole pieces, said outer and inner rings being so positioned that the pole pieces thereon form pairs of shaded and unshaded pole pieces with a greater spacing between the pairs than between the pole pieces of each pair, a path of magnetic material connecting one end of said magnetic core to said outer pole piece rings, means securing said inner pole piece rings to the opposite end of said magnetic core, and a rotor magnetically associated with said magnetic field structure.

4. In a synchronous motor, a magnetic core with an energizing winding mounted thereon, a magnetic field structure energized from said magnetic core and including a plurality of inner and outer pole piece rings, said inner and outer pole piece rings each having pole pieces thereon which are positioned axially of said magnetic core and which pole pieces extend toward the other of said inner or outer pole piece rings, shading means positioned between said inner and outer pole piece rings respectively to provide rings of shaded and rings of unshaded pole pieces, said outer and inner rings being so positioned that the pole pieces thereon form pairs of shaded and unshaded poles with a greater spacing between said pairs of pole pieces than between the pole pieces of each pair, a path of magnetic material connecting one end of said magnetic core to said outer pole piece rings, means connecting said inner pole piece rings to the other end of said magnetic core, said inner and outer pole piece rings being disposed from one another to form an annular air gap therebetween, and a rotor positioned within said annular air gap.

5. In a synchronous motor, a magnetic core with an energizing winding thereon, a magnetic field structure energized from said magnetic core and including a plurality of inner and outer pole piece rings, said inner and outer pole piece rings each having pole pieces thereon which are positioned axially of said magnetic core and which pole pieces extend toward the other of said inner and outer pole piece rings, shading means positioned between said rings to provide rings of shaded and rings of unshaded poles pieces, said outer and inner rings being so positioned that the pole pieces thereon form pairs of shaded and unshaded poles with a greater spacing between the pairs and between the pole pieces of each pair, means connecting said inner and outer pole piece rings to opposite ends of said magnetic core, the pairs of poles pieces on said inner ring being so located that the radial lines drawn through the middle of each inner pole piece passes through the spacing between the pairs of said outer pole pieces, said inner and outer pole piece rings being so positioned relative to one another to provide an annular air gap therebetween, and a rotor positioned within said annular air gap.

6. In a synchronous motor, a magnetic core with an energizing winding thereon, a magnetic field structure energized from said magnetic core and including a plurality of inner and outer pole piece rings, said inner and outer pole piece rings each having pole pieces thereon which are positioned axially of said magnetic core and which pole pieces extend toward the other of said inner and outer pole piece rings, shading means positioned between said rings to provide rings of shaded and rings of unshaded pole pieces, said outer and inner rings being so positioned that the pole pieces thereon form pairs of shaded and unshaded poles with a greater spacing between the pairs than between the pole pieces of each pair, means connecting said inner and outer pole piece rings to opposite ends of said magnetic core, the outer edges of each pair of inner pole pieces overlapping an outer edge of one pole piece in adjacent pairs of outer pole pieces, said inner and outer pole piece rings being so positioned relative to one another to provide an annular air gap therebetween, and a rotor positioned within said annular air gap.

7. In a synchronous motor, a magnetic core with an energizing winding thereon, a magnetic field structure energized from said magnetic core and including a plurality of inner and outer pole piece rings, said inner and outer pole piece rings each having pole pieces thereon which are positioned axially of said magnetic core and which pole pieces extend toward the other of said inner and outer pole piece rings, shading means positioned between said rings to provide rings of shaded and rings of unshaded pole pieces, said outer and inner rings being so positioned that the pole pieces thereon form pairs of shaded and unshaded poles with a greater spacing between the pairs than between the pole pieces of each pair, means connecting said inner and outer pole piece rings to opposite ends of said magnetic core, the shaded pole pieces of said inner and outer pole piece rings having a larger cross sectional area than the unshaded pole pieces of said rings, said inner and outer pole piece rings being so positioned relative to one another to provide an annular air gap therebetween, and a rotor positioned within said annular air gap.

8. In a synchronous motor, a magnetic core with an energizing winding thereon, a magnetic field structure energized from said magnetic core and including a plurality of inner and outer pole piece rings, said inner and outer pole piece rings each having pole pieces thereon which are positioned axially of said magnetic core and which pole pieces extend toward the other of said inner and outer pole piece rings, shading means positioned between said rings to provide rings of shaded and rings of unshaded pole pieces, said outer and inner rings being so positioned that the pole pieces thereon form pairs of shaded and unshaded poles with a greater spacing between the pairs of and between the pole pieces of each pair, means connecting said inner and outer pole piece rings to opposite ends of said magnetic core, the shaded poles of each pair of pole pieces on said inner and outer pole piece rings overlapping the unshaded pole pieces of each adjacent pair of pole pieces on the other ring, said inner and outer pole piece rings being so positioned relative to one another to provide an annular air gap therebetween, and a rotor positioned within said annular air gap.

9. In a synchronous motor, a magnetic core with an energizing winding thereon, a magnetic field structure energized from said magnetic core and including a plurality of inner and outer pole piece rings, said inner and outer pole piece rings each having pole pieces thereon which are positioned axially of said magnetic core and which pole pieces extend toward the pole pieces of the other inner or outer pole piece ring, shading means located between said rings to provide rings of shaded and rings of unshaded pole pieces, said inner and outer pole piece rings being so positioned that the pole pieces thereon form pairs of shaded and unshaded poles at a greater spacing between said pairs than between the pole pieces of each pair, means connecting said inner and outer pole piece rings to opposite ends of said magnetic core, the shaded poles on each pair of pole pieces on said inner and outer pole piece rings overlapping the unshaded pole pieces of the adjacent pairs on said rings, and a rotor of magnetic material magnetically associated with said magnetic field structure.

10. In a synchronous motor, a magnetic core with an energizing winding thereon, a magnetic field structure energized from said magnetic core and including a plurality of inner and outer pole piece rings, said inner and outer pole piece rings each having pole pieces thereon which are positioned axially of said magnetic core and which pole pieces extend toward the pole pieces of the other inner and outer pole piece rings, shading means positioned between said inner and outer pole piece rings to provide rings of shaded and rings of unshaded pole pieces, said inner and outer pole piece rings being so positioned that the pole pieces thereon form pairs of shaded and unshaded poles with a greater spacing between said pairs than between the pole pieces of each pair, means connecting said inner and outer pole piece rings to opposite ends of said magnetic core, said shaded pole pieces of said inner and outer pole piece rings having a larger cross sectional area than the unshaded pole pieces of said rings, and a rotor of a magnetic material magnetically associated with said magnetic field structure.

11. In a synchronous motor, a magnetic core, a magnetic field structure adapted to be energized from said magnetic core and including a plurality of inner and outer pole piece rings, said inner and outer pole piece rings each having pole pieces thereon which are positioned axially of said magnetic core and which pole pieces extend toward the pole pieces of the other of said inner and outer pole piece rings, shading means positioned between said rings to provide rings of shaded and rings of unshaded pole pieces, said inner and outer pole piece rings being so positioned that the pole pieces thereon form pairs of shaded and unshaded poles with a greater spacing between said pairs than between the pole pieces of each pair, means connecting said inner and outer pole piece rings to opposite ends of said magnetic core, said inner and outer pole piece rings being so positioned relative to one another to provide an annular air gap therebetween, said shaded pole pieces of said inner and outer pole piece rings subtending a greater angular distance than said unshaded pole pieces of said rings, and a rotor of magnetic material positioned in said annular air gap.

12. In a synchronous motor, a magnetic core with an energizing winding thereon, a magnetic field structure energized by said magnetic core and including a plurality of inner and outer pole piece rings, said inner and outer pole piece rings each having pole pieces thereon which are positioned axially of said magnetic core, shading means located between said rings to provide said rings of shaded and rings of unshaded pole pieces, said outer and inner rings being so positioned that the pole pieces thereon form pairs of shaded and unshaded pole pieces with a greater spacing between the pairs than between the pole pieces of each pair, a path of magnetic material connecting one end of said magnetic core to said outer pole piece rings, means securing said inner pole piece rings to the opposite end of said magnetic core, and a rotor mognetically associated with said magnetic field structure.

13. In an alternating current motor, a magnetic core with an energizing winding thereon, a magnetic field structure energized by said magnetic core and including pole piece structures attached to either end of said magnetic core and being concentric thereon, each of said pole piece structures including a pair of pole piece rings having pole pieces thereon extending axially of said magnetic core, all of said pole pieces originating from said pole piece structures at the same radial region with respect to one end of said magnetic core, an annular portion included in one of said pole piece structures and exclusive of said pole pieces thereon which partially encloses said magnetic core and said winding thereon, a single shading means positioned between each of said pairs of pole piece rings to provide alternately shaded and unshaded pole pieces, and a rotor magnetically associated with said magnetic field structure.

14. In an alternating current motor, a magnetic core with an energizing winding thereon, a magnetic field structure energized by said magnetic core and including pole piece structures attached to either end of said magnetic core and being concentric therewith, each of said pole piece structures including a pair of pole piece rings having pole pieces thereon extending axially of said magnetic core, all of said pole pieces originating from said pole piece structures at the same radial region adjacent one end of said magnetic core, a single shading means positioned between each of said pairs of pole piece rings to provide alternately shaded and unshaded pole pieces, and a rotor magnetically associated with said magnetic field structure.

15. In an alternating current motor, a magnetic core with an energizing winding thereon, a magnetic field structure energized by said magnetic core and including pole piece structures attached to either end of said magnetic core, and being concentric therewith, each of said pole piece structures including a pair of pole piece rings having pole pieces thereon extending axially of said magnetic core, all of said pole pieces originating from said pole piece structures at the same radial region adjacent one end of said magnetic core, the pole piece rings of one of said pole piece structures attached to one end of said magnetic core being spaced radially from the pole piece rings of the other of said pole piece structures attached to the other end of said magnetic core to provide an annular air gap therebetween, a single shading means positioned between said rings of each of said pole piece structures to provide alternately shaded and unshaded pole pieces, and a rotor positioned to rotate within said annular air gap.

16. In a synchronous motor, a magnetic core with an energizing winding thereon, a magnetic field structure housing said magnetic core and said energizing winding and being energized from the same, said magnetic field structure including a plurality of inner and outer pole piece rings with pole pieces thereon extending axially of said magnetic core, said inner and outer pole piece rings being located in the same relative position with respect to said core and being magnetically connected to opposite extremities of said core, shading means located between said inner rings and between said outer rings to provide rings of shaded and rings of unshaded pole pieces, means securing said inner pole piece rings and their shading means to one end of said magnetic core in assembled relationship, means connecting said outer pole piece rings and their shading means in assembled relationship including a plurality of tapped bushings, a gear train positioned on said magnetic field structure at said tapped bushings and secured thereto by screws which thread into said tapped bushings, a rotor of high magnetic retentivity journaled in said gear train and magnetically associated with said magnetic field structure, and a cup-shaped cover member of nonmagnetic material enclosing said gear train and said pole pieces of said magnetic field structure.

17. In a synchronous motor, a magnetic core with an energizing winding thereon, a magnetic field structure housing said magnetic core and said energizing winding and being energized from the same, said magnetic field structure including a plurality of inner and outer pole piece rings with pole pieces thereon extending axially of said magnetic core, said inner and outer pole piece rings being located to the side of one extremity of said magnetic core and being magnetically connected to opposite extremities of said magnetic core, shading means located between said inner rings and between said outer rings to provide rings of shaded and rings of unshaded pole pieces, means securing said inner pole piece rings and their shading means to one end of said magnetic core in assembled relationship, means connecting said outer pole piece rings and their shading means in assembled relationship including a plurality of tapped bushings, a gear train positioned on said magnetic field structure at said tapped bushings and secured thereto by screws which thread into said tapped bushings, and a rotor of high magnetic retentivity journaled in said gear train and magnetically associated with said magnetic field structure, and a cup-shaped cover member of nonmagnetic material enclosing said gear train and said pole pieces of said magnetic field structure.

18. In a synchronous motor, a magnetic core with an energizing winding thereon, a magnetic field structure housing said magnetic core and said energizing winding and being energized from the same, said magnetic field structure including a plurality of inner and outer pole piece rings with pole pieces thereon extending axially of said magnetic core, said inner and outer pole piece rings being located to the side of one extremity of said magnetic core and being magnetically connected to opposited extremities of said magnetic core, shading means located between said inner rings and between said outer rings to provide rings of shaded and rings of unshaded pole pieces, means securing said inner pole piece rings and their shading means to one end of said magnetic core in assembled relationship, means connecting said outer pole piece rings and their shading means in assembled relationship including a plurality of tapped bushings, a gear train positioned on said magnetic field structure at said tapped bushings and secured thereto by screws which thread into said tapped bushings, a rotor of high magnetic retentivity journaled in said gear train and magnetically associated with said magnetic field structure, and a cup-shaped cover member of nonmagnetic material enclosing said gear train and said pole pieces of said magnetic field structure, said cover member being of the same diametrical dimensions as said magnetic field structure and being secured to said gear train and said magnetic field structure by a liquid tight seal.

19. In a synchronous motor, a magnetic core with an energizing winding thereon, a magnetic field structure housing said magnetic core and said energizing winding and being energized from the same, said magnetic field structure including a plurality of inner and outer pole piece rings with pole pieces thereon extending axially of said magnetic core, said inner and outer pole piece rings being located in the same relative position with respect to said core and being magnetically connected to opposite extremities of said core, shading means located between said inner rings and between said outer rings to provide rings of shaded and rings of unshaded pole pieces, means securing said inner pole piece rings and their shading means to one end of said magnetic core in assembled relationship, means connecting said outer pole piece rings and their shading means in assembled relationship including a plurality of tapped bushings, a gear train positioned on said magnetic field structure at said tapped bushings and secured thereto by screws which thread into said tapped bushings, said gear train including a pair of side plates which hold the gears in assembled relationship, said side plates being held together by tapped sleeve members through which said screws thread to fit into said tapped bushings, one of said tapped sleeve elements having a transverse duct therethrough, a cup-shaped rotor element of high magnetic material journaled on said gear train and magnetically associated with said magnetic field structure, and a cup-shaped cover member of nonmagnetic material enclosing said gear train and fitting onto said magnetic field structure, one of said screws being threaded through said tapped sleeve element having said transverse duct and into a tapped bushing through an aperture in said casing.

20. In a motor, a magnetic field structure including an energizing core with a winding thereon and a plurality of pole piece members attached to said magnetic core, one of said pole piece members being cup shaped in form and positioned to substantially encircle said core and said winding, said one of said pole piece members having a continuous peripheral shoulder thereon, a rotor magnetically associated with said field structure, a gear train connected to said rotor and mounted on said field structure, casing means having a periphery of the same shape as said shoulder resting on said shoulder of said pole piece member in a telescopic manner and enclosing said gear train and said rotor, and means including said gear train for securing said casing member on said shoulder of said pole piece member.

21. In a motor, a magnetic field structure including an energizing core with a winding thereon and a plurality of pole piece members attached to said core, one of said pole piece members having a continuous peripheral shoulder portion thereon, a rotor magnetically associated with said field structure, a gear train attached to said rotor, means including a plurality of sleeve members mounting said gear train is assembled relationship on said field structure, one of said sleeve members having a passage therein communicating with a lubricating means for said gear train, a cover having a peripheral shape similar to said shoulder portion of said one of said pole piece members resting on said shoulder of said pole piece member and enclosing said gear train and rotor, said cover having an aperture therein aligned with said sleeve member having said passage therein, and means mounted in one of said sleeves from without said cover through said aperture.

22. In a motor, a magnetic field structure including an energizing core with a winding thereon and a plurality of pole piece members attached to said core, a rotor magnetically associated with said field structure, a gear train attached to said rotor, means including a plurality of sleeve members mounting said gear train in assembled relationship on said field structure, one of said sleeve members having a passage therein communicating with a lubricating means for said gear train, a cover means mounted on said field structure enclosing said gear train and said rotor, said cover means having an aperture therein aligned with said sleeve member having said passage, and means mounted in said one of said sleeves through said aperture in said cover and from without said cover for securing said cover to said gear train.

23. In a synchronous motor, a magnetic core with an energizing winding thereon, a magnetic field structure including inner and outer portions with pole pieces thereon extending axially of said core and being concentric therewith, all of said pole pieces originating from said portions of said structure at the same radial region with respect to one end of said magnetic core, means connecting respectively said outer and inner portions to opposite extremities of said magnetic core, shading means encircling alternate pole pieces of said inner and outer portions to provide alternately shaded and unshaded pole pieces thereon, and a rotor magnetically associated with said magnetic field structure.

24. In a synchronous motor, a magnetic core with an energizing winding thereon, a magnetic field structure including inner and outer portions with pole pieces thereon extending axially of said core and being concentric therewith, all of said pole pieces originating from said portions of said structure at the same radial region with respect to one end of said magnetic core and with said outer portion being in part an annular shell encircling said core and said winding thereon, means connecting respectively said outer and inner portions to opposite extremities of said magnetic core, shading means encircling alternate pole pieces of said inner and outer portions to provide alternately shaded and unshaded pole pieces thereon, and a rotor magnetically associated with said magnetic field structure.

25. In a synchronous motor, a magnetic core with an energizing winding thereon, a magnetic field structure including inner and outer portions with pole pieces thereon extending axially of said core and being concentric therewith, all of said pole pieces originating from said portions of said structure at the same radial region with respect to one end of said magnetic core and with said outer portion being in part an annular shell encircling said core and said winding thereon, means magnetically connecting respectively said inner and outer portions to opposite extremities of said magnetic core, said pole pieces of said outer portion being spaced radially from the pole pieces of said inner portion to provide an annular air gap therebetween, shading means encircling alternate pole pieces of said inner and outer portions to provide alternately shaded and unshaded pole pieces thereon, and a rotor positioned to rotate within said annular air gap.

CARL G. KRONMILLER.
WILLIS H. GILLE.

REFERENCES CITED

The following references are of record in the file of this patent:

UNITED STATES PATENTS

| Number | Name | Date |
|---|---|---|
| 1,799,348 | Apple | Apr. 7, 1931 |
| 2,049,261 | Haydon | July 28, 1936 |
| 2,070,447 | Morrill | Feb. 9, 1937 |
| 2,171,987 | Poole | Sept. 5, 1939 |
| 2,234,420 | Traeger | Mar. 11, 1941 |
| 2,289,495 | Hansen et al. | July 14, 1942 |
| 2,292,265 | Carpenter | Aug. 4, 1942 |
| 2,349,620 | Hansen et al. | May 23, 1944 |
| 2,537,090 | Schlenker et al. | Jan. 9, 1951 |

FOREIGN PATENTS

| Number | Country | Date |
|---|---|---|
| 436,145 | Great Britain | Oct. 7, 1935 |
| 446,469 | Great Britain | Apr. 30, 1936 |
| 449,075 | Great Britain | June 19, 1936 |